United States Patent [19]
Wilson

[11] Patent Number: 5,289,559
[45] Date of Patent: Feb. 22, 1994

[54] CABLE SECURITY APPARATUS

[76] Inventor: Edwin P. Wilson, 8147 Post Rd., Allison Park, Pa. 15101

[21] Appl. No.: 792,780

[22] Filed: Nov. 15, 1991

[51] Int. Cl.⁵ .............................................. G02B 6/38
[52] U.S. Cl. .................................. 385/136; 340/555; 340/568
[58] Field of Search ................................. 385/95-99, 385/136, 12, 13; 340/555, 556, 557, 568, 571

[56] References Cited

U.S. PATENT DOCUMENTS

| | | | |
|---|---|---|---|
| 4,161,348 | 7/1979 | Ulrich | 385/54 |
| 4,379,289 | 4/1983 | Peek | 340/555 |
| 4,379,289 | 4/1983 | Peek | 385/12 |
| 4,399,430 | 8/1983 | Kitchen | 385/88 |
| 4,447,123 | 5/1984 | Page et al. | 385/115 |
| 4,546,345 | 10/1985 | Naito | 340/542 |
| 4,591,709 | 5/1986 | Koechner et al. | 250/221 |
| 4,850,670 | 7/1989 | Mathis et al. | 385/72 X |
| 5,003,292 | 3/1991 | Harding et al. | 385/13 |
| 5,055,827 | 10/1991 | Philipp | 340/568 |

Primary Examiner—Frank Gonzalez
Attorney, Agent, or Firm—Ansel M. Schwartz

[57] ABSTRACT

The present invention is an apparatus for holding a first cable and a second cable in communication on an object. The apparatus includes a first member for holding a first end of the first cable and a second member for holding a second end of the second cable. The second member is disposed in a predetermined adjacent relationship with the first member such that the first and second ends are abutted up against each other and can communicate a signal therebetween. The apparatus also has means for affixing each of the first and second members separately to the object in the predetermined adjacent relationship. Preferably, the cables are fiber optic cables and the signal is light. In an alternative, the first and second members are fixedly attached to a spring base. The spring base is for maintaining the members in the predetermined adjacent relationship such that the first and second ends are abutted and can communicate a signal therebetween when the object is on the apparatus.

18 Claims, 3 Drawing Sheets 5,289,559

1

CABLE SECURITY APPARATUS

FIELD OF THE INVENTION

The present invention is related to cables. More specifically, the present invention is related to a cable security apparatus for protecting objects against theft.

BACKGROUND OF THE INVENTION

The Light-Gard ™ system is known to protect valuable objects against theft by connecting them to a cable which carries a signal. In order to steal an object, the cable usually must be broken. An alarm is typically provided for alerting the appropriate people when the signal is received which indicates the cable has been broken. Such an alarm system is the Minatronics Light-Gard ™ product.

SUMMARY OF THE INVENTION

The present invention is an apparatus for holding a first cable and a second cable in communication on an object. The apparatus includes a first member for holding a first end of the first cable and a second member for holding a second end of the second cable. The second member is disposed in a predetermined adjacent relationship with the first member such that the first and second ends are abutted up against each other and can communicate a signal therebetween. The apparatus also has means for affixing each of the first and second members separately to the object in the predetermined adjacent relationship. Preferably, the cables are fiber optic cables and the signal is light.

In a preferred embodiment, the first member has a first opening in which the first cable is held. Similarly, the second member has a second opening in which the second cable is held. Retaining clips can be provided for holding the cables securely in the openings.

In an alternative embodiment, the first and second members are fixedly attached to a spring base. The spring base is for maintaining the members in the predetermined adjacent relationship such that the first and second ends are abutted and can communicate a signal therebetween when the object (not shown) is on the apparatus.

The invention is also a system for protecting an object. The system includes a first cable having a first end and a second cable having a second end. There is a support structure in contact with the object for maintaining the first end of the first cable and the second end of the second cable in communication such that a signal can pass therebetween. The support structure separates the first end from the second end when contact between the support structure and the object is disrupted in a predetermined manner.

The invention is also a method for installing a first cable in communication with a second cable. The method comprises the first step of inserting an alignment wire through a first opening of a first member and a second opening of a second member such that the openings are aligned with each other. Then, there is the step of affixing separately the first member and the second member to the object in an adjacent relationship with the openings aligned with each other. Next, there is the step of removing the alignment wire from the openings. Then, there is the step of inserting a first end of the first cable into the first opening and the step of inserting a second end of the second cable into the second opening such that the second end abuts up in communication against the first end.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
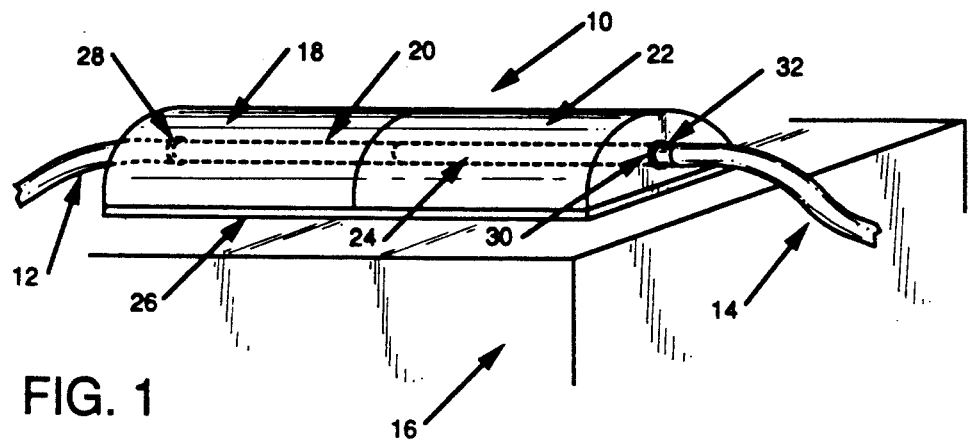
FIG. 1 is a schematic representation showing the apparatus affixed to an object.

Referring now to the drawings wherein like reference numerals refer to similar or identical parts throughout the several views, and more specifically to FIG. 1 thereof, there is shown an apparatus 10 for holding a first cable 12 and a second cable 14 in communication on an object 16. The apparatus includes a first member 18 for holding a first end 20 of the first cable 12 and a second member 22 for holding a second end 24 of the second cable 14. The second member 22 is disposed in a predetermined adjacent relationship with the first member 18 such that the first and second ends 20, 24 abut against each other and can communicate a signal therebetween. The apparatus 10 also has means 26 for affixing each of the first and second members 18 and 22 separately to the object in the predetermined adjacent relationship. Preferably, the cables 12 and 14 are fiber optic cables and the signal is light.

In a preferred embodiment, the first member 18 has a first opening 28 in which the first cable 12 is held. Similarly, the second member 22 has a second opening 30 in which the second cable 14 is held. Retaining clips 32 can be provided for holding the cables 12 and 14 securely in the openings 28, 30. The affixing means 26 is preferably a strong adhesive such as Loctite ® super glue #82192 which permanently bonds the members 18, 22 to the object 16.

Figure 2A:
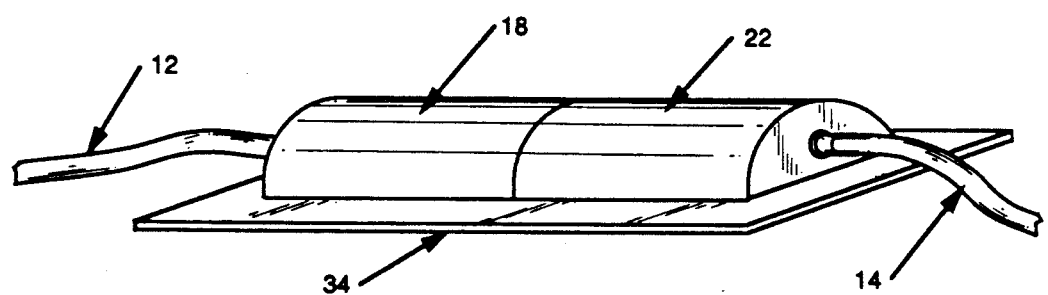
FIGS. 2a and 2b are schematic representations showing an alternative embodiment of the apparatus.
Figure 2B:
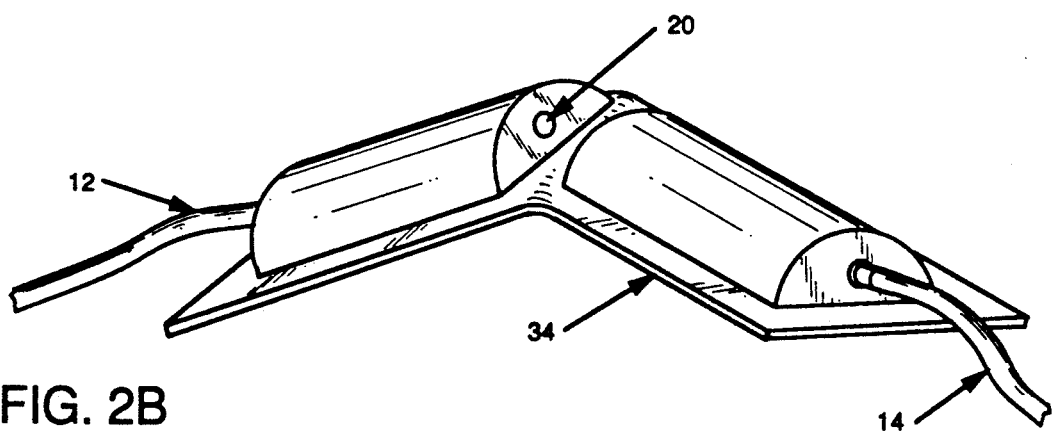

In an alternative embodiment and as shown in FIG. 2, the first and second members 18, 22 are fixedly attached to a spring base 34. The spring base 34 is for maintaining the members 18, 22 in the predetermined adjacent relationship such that the first and second ends abutted and can communicate a signal therebetween when the object 16 (not shown) is on the apparatus 10. As shown in FIG. 2b, when the object is lifted off the apparatus 10, as in a theft, the spring base 34 moves the first and second members 18, 22 from the predetermined adjacent relationship, thereby preventing the first and second ends 20, 24 from abutting and communicating a signal therebetween. Preferably, the spring base 34 is a steel plate which recoils into a curve after the object 16 has been lifted off of the apparatus 10.

Figure 3:
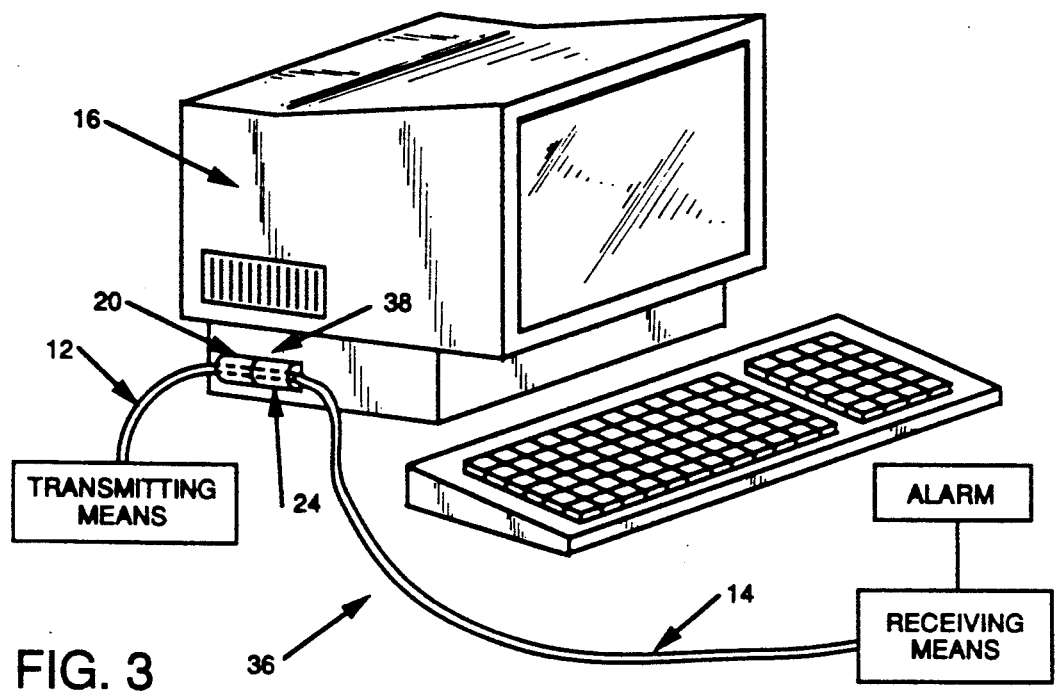
FIG. 3 is a schematic representation showing a first embodiment of the system for protecting an object.
Figure 4:
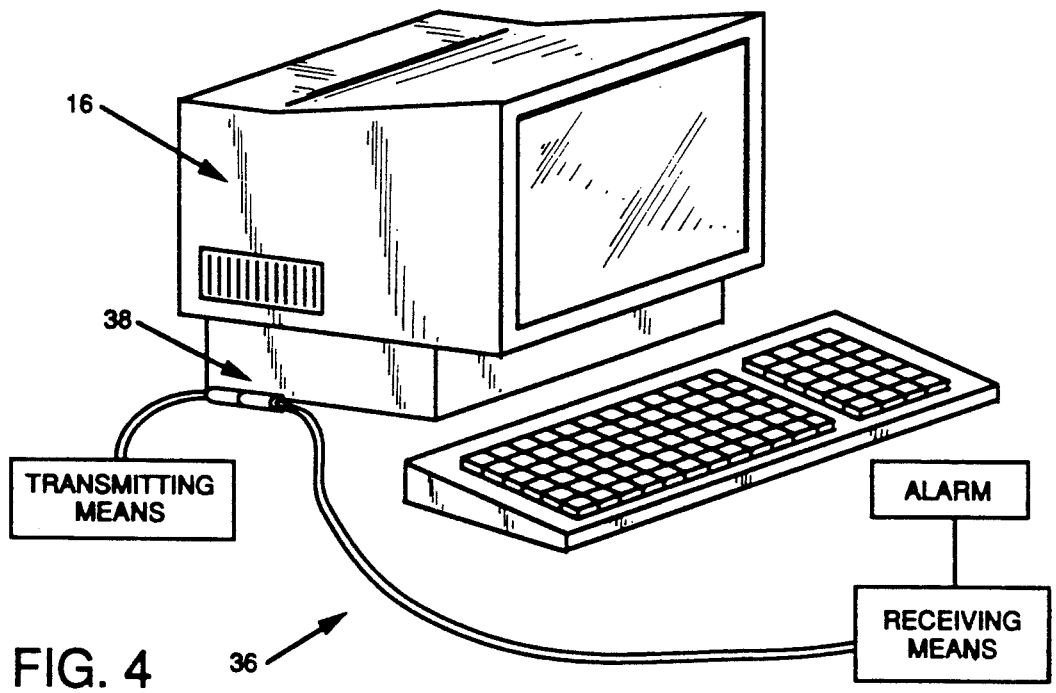
FIG. 4 is a schematic representation showing a second embodiment of the system for protecting an object.

As shown in FIG. 3, the invention is also a system 36 for protecting an object 16 The system 36 includes a first cable 12 having a first end 20 and a second cable 14 having a second end 24. There is a support structure 38 in contact with the object 16 for maintaining the first end 20 of the first cable 18 and the second end 24 of the second cable 12 in communication such that a signal can pass therebetween. The support structure 38 separates the first end 20 from the second end 24 when contact between the support structure 38 and the object is disrupted in a predetermined manner. The support structure 38 can include separately affixed first and second members 18, 22 as described previously and as shown in FIG. 1. Alternatively, the support structure 38 can include a spring base 34 to which the first and second members 18, 22 are attached. In this case, the object 16 rests on the apparatus 10 as shown in FIG. 4.

The system 36 also includes means for transmitting a signal. The transmitting means is in communication with the first cable 12. There is also means for receiving a signal. The receiving means is in communication with the second cable 14. An alarm 44 is provided for indicating when the receiving means does not receive an expected signal from the transmitting means. The alarm 44 can be an audio or visual warning system or can generate signals which control other apparatuses such as door locks or cameras.

Figure 5A:
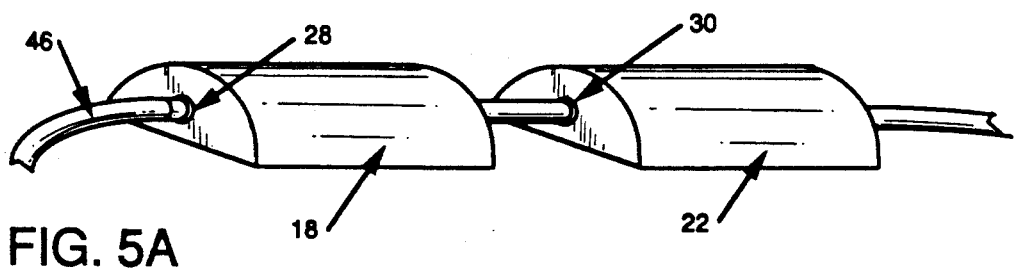
FIGS. 5a-5d are schematic representations showing the method of installing a first cable in communication with a second cable.
Figure 5B:
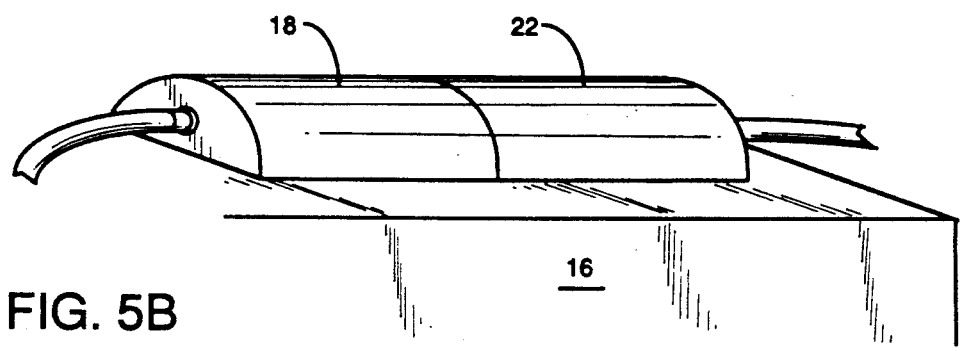
Figure 5C:
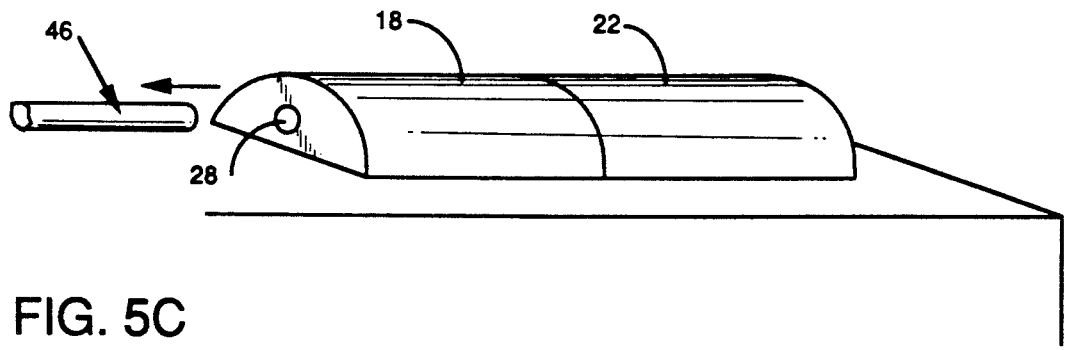
Figure 5D:
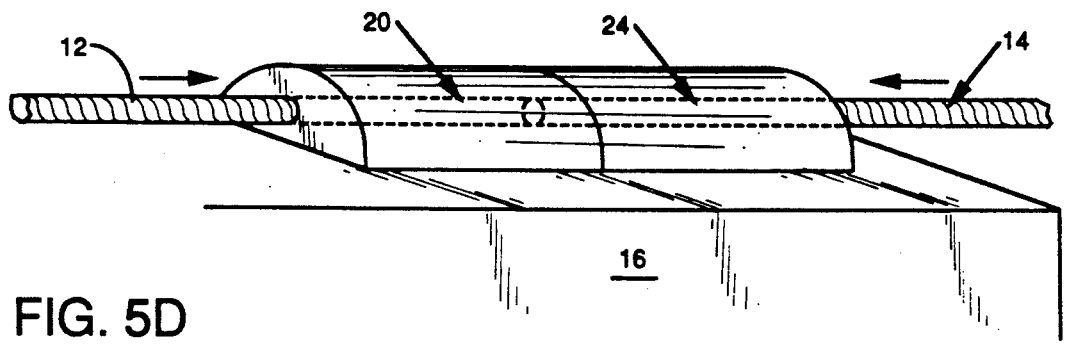

As shown in FIGS. 5a-5d, the present invention is also a method for installing a first cable 12 in communication with a second cable 14. As shown in FIG. 5a, the method comprises the first step of inserting an alignment wire 46 through a first opening 28 of a first member 18 and a second opening 30 of a second member 22 such that the openings 28, 30 are aligned with each other. Then, as shown in FIG. 5b, there is the step of affixing separately the first member 18 and the second member 22 to the object 16 in an adjacent relationship with the openings 28, 30 aligned with each other. Next, as shown in FIG. 5c, there is the step of removing the alignment wire 46 from the openings 28, 30. Then, as shown in FIG. 5d, there is the step of inserting a first end 20 of the first cable 12 into the first opening 28 and the step of inserting a second end 24 of the second cable 14 into the second opening 30 such that the second end 24 abuts against the first end 20.

In the operation of the invention, an alignment wire is threaded through the openings of the first and second members such that they are aligned. With the alignment wire holding the first and second members in the proper orientation, the first and second members are glued to a computer with Loctite ® super glue *82192. Once the glue hardens, the alignment wire is removed from the openings.

Next, the ends of the cable are fitted with brass retention clips. This is accomplished by starting a retention clip onto each end of the cable. The retention clip is then supported on a hard flat surface while the cable is pressed into the retention clip until its beaded end is flush with the end of the retention clip.

Once the cables are installed within the first and second members in the proper abutting relationship, a light signal transmitting device is attached in communication to one fiber optic cable while a light signal receiving device is attached in communication with the other cable. The light signal transmitting device sends a signal of light through the abutting cables to the receiving apparatus. If the light signal does not reach the receiving device an alarm is sounded which alerts others that the cable has been disconnected.

In this manner, anyone trying to remove the fiber optic cables from the computer will have extreme difficulty since both members will have to be broken off simultaneously and will have to be kept in the predetermined adjacent relationship after they have been broken off. This will be very difficult since both members are independently affixed to the computer and are not connected to each other.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is;

1. An apparatus for holding a first cable and a second cable in communication on an object comprising:
   a first member for holding a first end of the first cable;
   a second member for holding a second end of the second cable, said second member disposed in a predetermined adjacent relationship with the first member such that the first and second ends abut and can communicate a signal therebetween; and
   means for affixing each of the first and second members separately to the object in said predetermined adjacent relationship, said first member affixed to the object independently from said second member and said second member affixed to the object independently from the first member such that upon removal of the apparatus from the object, the first and second members become separated.

2. An apparatus as described in claim 1 wherein said first and second cables are fiber optic cables.

3. An apparatus as described in claim 2 wherein the first member has a first opening in which the first fiber optic cable is held and the second member has a second opening in which the second fiber optic cable is held.

4. An apparatus as described in claim 3 wherein the first and second fiber optic cables are held within their respective openings with retaining clips.

5. An apparatus as described in claim 4 wherein the affixing means is comprised of an adhesive.

6. An apparatus for holding a first cable and a second cable in communication on an object comprising:
   a first member for holding a first end of the first cable;
   a second member for holding a second end of the second cable; and
   a spring base on which the first and second members are affixed for maintaining the members in a predetermined adjacent relationship such that the first and second ends abut and can communicate a signal therebetween when the object is on the apparatus and then when the object is lifted off of the apparatus, the spring base moves the first and second members from the predetermined adjacent relationship, thereby preventing the first and second ends from abutting and communicating a signal therebetween.

7. An apparatus as described in claim 6 wherein said first and second cables are fiber optic cables.

8. An apparatus as described in claim 7 wherein the first member has a first opening in which the first fiber optic cable is held and the second member has a second opening in which the second fiber optic cable is held.

9. An apparatus as described in claim 8 wherein the first and second fiber optic cables are held within their respective openings with retaining clips.

10. An apparatus as described in claim 9 wherein the spring base is comprised of a steel plate.

11. A system for protecting an object comprising:
    a first fiber optic cable having a first end;
    a second fiber optic cable having a second end;

a first support member having a first opening for holding a first end of the first cable;

a second member having a second opening for holding a second end of the second cable, said second member disposed in a predetermined adjacent relationship with the first member such that the first and second ends are abutted and can communicate a signal therebetween;

means for affixing each of the first and second members separately to the object in said predetermined adjacent relationship;

retaining clips for holding the ends of the fiber optic cables within their respective openings;

means for transmitting a signal, said transmitting means in communication with said first cable;

means for receiving a signal, said receiving means in communication with said second cable; and an alarm for indicating when the receiving means does not receive an expected signal from the transmitting means, said alarm in communication with said receiving means.

12. An apparatus as described in claim 11 wherein the affixing means is comprised of an adhesive.

13. A method for installing a first cable in communication with a second cable comprising the steps of:

inserting an alignment wire through a first opening of a first member and a second opening of a second member such that the openings are aligned with each other;

affixing separately the first member and second member to the object in an adjacent relationship with the openings aligned;

removing the alignment wire from the opening;

inserting a first end of the first cable into the first opening; and inserting a second end of the second cable into the second opening such that the second end abuts up in communication against the first end.

14. An apparatus for holding a first fiber optic cable and a second fiber optic cable in communication on an object comprising:

a first member having a first opening for holding a first end of the first cable;

a second member having a second opening for holding a second end of the second cable, said second member disposed in a predetermined adjacent relationship with the first member such that the first and second ends abut and can communicate a signal therebetween; and means for affixing each of the first and second members separately to the object in said predetermined adjacent relationship; and retaining clips for holding the ends of the fiber optic cables within their respective openings.

15. An apparatus as described in claim 14 wherein the affixing means is comprised of an adhesive.

16. An apparatus for holding a first fiber optic cable and a second fiber optic cable in communication on an object comprising:

a first member having a first opening for holding a first end of the first cable;

a second member having a second opening for holding a second end of the second cable;

a spring base on which the first and second members are affixed for maintaining the members in a predetermined adjacent relationship such that the first and second ends abut and can communicate a signal therebetween when the object is on the apparatus and then when the object is lifted off of the apparatus, the spring base moves the first and second members from the predetermined adjacent relationship, thereby preventing the first and second ends from abutting and communicating a signal therebetween; and retaining clips for holding the fiber optic cables in their respective openings.

17. An apparatus as described in claim 16 wherein the spring base is comprised of a steel plate.

18. An apparatus for holding a first fiber optic cable and a second fiber optic cable in communication on an object comprising:

a first member having a first opening for holding a first end of the first cable;

a second member having a second opening for holding a second end of the second cable, said second member disposed in a predetermined adjacent relationship with the first member such that the first and second ends abut and can communicate a signal therebetween; and means for affixing each of the first and second members separately to the object in said predetermined adjacent relationship, wherein the affixing means is comprised of an adhesive; and retaining clips for holding the ends of the fiber optic cables within their respective openings.

* * * * *